(12) United States Patent
Chang et al.

(10) Patent No.: US 11,237,648 B2
(45) Date of Patent: Feb. 1, 2022

(54) TOUCH SENSITIVE PROCESSING METHOD AND APPARATUS AND TOUCH SENSITIVE SYSTEM FOR REDUCING DETECTION TIME PERIOD OF TETHERED STYLUS

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 180 days.

(21) Appl. No.: 16/846,763

(22) Filed: Apr. 13, 2020

(65) Prior Publication Data
US 2020/0241661 A1    Jul. 30, 2020

Related U.S. Application Data

(63) Continuation-in-part of application No. 16/795,856, filed on Feb. 20, 2020, which is a continuation of application No. 15/788,051, filed on Oct. 19, 2017, now Pat. No. 10,606,375, which is a continuation of application No. 14/537,082, filed on Nov. 10, 2014, now Pat. No. 9,851,816.

(60) Provisional application No. 62/833,092, filed on Apr. 12, 2019, provisional application No. 62/055,995, filed on Sep. 26, 2014, provisional application No. 61/992,340, filed on May 13, 2014, provisional application No. 61/945,397, filed on Feb. 27, 2014, (Continued)

(30) Foreign Application Priority Data

Dec. 11, 2019   (TW) .................................. 108145396

(51) Int. Cl.
| | |
|---|---|
| *G06F 3/038* | (2013.01) |
| *G06F 3/0354* | (2013.01) |
| *G06F 3/041* | (2006.01) |
| *G06F 3/044* | (2006.01) |

(52) U.S. Cl.
CPC ........ *G06F 3/03545* (2013.01); *G06F 3/0383* (2013.01); *G06F 3/044* (2013.01); *G06F 3/0416* (2013.01); *G06F 2203/04108* (2013.01)

(58) Field of Classification Search
CPC .. G06F 3/03545; G06F 3/0383; G06F 3/0416; G06F 3/044; G06F 2203/04108
See application file for complete search history.

(56) References Cited

U.S. PATENT DOCUMENTS

| 7,148,882 B2 | 12/2006 | Kamrath et al. |
| 7,292,229 B2 | 11/2007 | Morag et al. |
| | (Continued) | |

FOREIGN PATENT DOCUMENTS

| CN | 1679078 | 10/2005 |
| CN | 202563463 | 11/2012 |
| | (Continued) | |

*Primary Examiner* — Towfiq Elahi
(74) *Attorney, Agent, or Firm* — WPAT, PC

(57) ABSTRACT

The present application provides a touch sensitive processing method for a tethered stylus. The method comprises selectively driving two of three circuit components of the stylus in three shorter time periods, sensing induced signals from electrodes of a touch panel, and calculating coordinates of a tip electrode and a surrounding electrode of the stylus accordingly.

17 Claims, 9 Drawing Sheets

Related U.S. Application Data provisional application No. 61/902,137, filed on Nov. 8, 2013.

(56) References Cited

U.S. PATENT DOCUMENTS

| | | | |
|---|---|---|---|
| 8,217,918 B2 | 7/2012 | Morag et al. | |
| 2004/0095333 A1* | 5/2004 | Morag | G06F 3/03545 345/173 |
| 2012/0242603 A1 | 9/2012 | Engelhardt et al. | |
| 2012/0327042 A1* | 12/2012 | Harley | G06F 3/03545 345/179 |
| 2013/0249823 A1* | 9/2013 | Ahn | G06F 3/038 345/173 |
| 2014/0002422 A1* | 1/2014 | Stern | G06F 3/044 345/179 |
| 2015/0029136 A1* | 1/2015 | Shahparnia | G06F 3/03545 345/174 |
| 2015/0199035 A1* | 7/2015 | Chang | G06F 3/03545 345/179 |
| 2018/0011587 A1* | 1/2018 | Tsou | G06F 3/0418 |
| 2018/0292691 A1* | 10/2018 | Chen | G01R 31/2825 |

FOREIGN PATENT DOCUMENTS

| | | |
|---|---|---|
| TW | M255462 | 1/2005 |
| TW | 200508580 | 3/2005 |
| TW | M387304 | 8/2010 |
| TW | 201040797 | 11/2010 |
| TW | 201106239 | 2/2011 |
| TW | 201209654 | 3/2012 |
| TW | 201234226 | 8/2012 |
| TW | 201235884 | 9/2012 |
| TW | 201237692 | 9/2012 |
| TW | M439852 | 10/2012 |
| TW | 201305859 | 2/2013 |
| TW | 201308129 | 2/2013 |
| TW | 201339904 | 10/2013 |
| TW | 201342175 | 10/2013 |

\* cited by examiner

770

771
adding corresponding element values of the first, the second and the third as all period one-dimension sensing information, respectively

772
calculating a first, a second and a third circuit component one-dimension sensing information according to the all period one-dimension sensing information and the first, the second and the third period one-dimension sensing information

773
calculating a first coordinate, a second coordinate, and a ring electrode coordinates, respectively, according to the first, the second and the third circuit component one-dimension sensing information

774
calculating a tip electrode coordinate according to the first and the second coordinates

775
calculating a tilt angle and an orientation direction according to the tip electrode coordinate and the ring electrode coordinate

776
calculating a pressure on the tip of the stylus according to a ratio of two elements of the first and the second circuit component one-dimension sensing information corresponding to at least one touch electrode which is further corresponding to the tip electrode coordinate

FIG. 8

TOUCH SENSITIVE PROCESSING METHOD AND APPARATUS AND TOUCH SENSITIVE SYSTEM FOR REDUCING DETECTION TIME PERIOD OF TETHERED STYLUS

CROSS REFERENCE TO RELATED APPLICATIONS

This application claims priority to U.S. provisional patent application, 62/833,092, filed on Apr. 12, 2019 and to Taiwan patent application No. 108145396, filed on Dec. 11, 2019. This application is also a continuation-in-part application of U.S. patent application Ser. No. 16/795,856, filed on Feb. 20, 2020, which is a continuation application of U.S. patent application Ser. No. 15/788,051, filed on Oct. 19, 2017, which is a continuation application of U.S. patent application Ser. No. 14/537,082, filed on Nov. 10, 2014, now U.S. Pat. No. 9,851,816, which claims priorities under 35 U.S.C 119 to U.S. provisional patent application, 61/902,137, filed on Nov. 8, 2013, U.S. provisional patent application, 61/945,397, filed on Feb. 27, 2014, U.S. provisional patent application, 61/992,340, filed on May 13, 2014, and U.S. provisional patent application, 62/005,995, filed on Sep. 26, 2014. The disclosures of which are incorporated herein by reference.

BACKGROUND OF THE INVENTION

1. Field of the Invention

The present invention relates to stylus detection, and more particularly, to a touch sensitive processing method with regard to a tethered stylus.

2. Description of the Prior Art

Touch screen or touch panel is one of the most popular input/output interface of modern electronics. When sizes of touch screens become more and more large, number of touch electrodes of touch screens increases accordingly. It is getting slow to scan styli on touch screen. How to accelerate the scans of styli by touch screen in order to maintain or even to increase report frequency of the scans is what the present application wants to solve.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

According to one embodiment, a touch sensitive processing apparatus provided is applicable to a touch panel and a stylus. The touch panel includes a plurality of first electrodes in parallel to a first direction and a plurality of second electrodes in parallel to a second direction. The stylus includes a tip electrode, a ring electrode surrounding the tip electrode, a first circuit component which has variable according to pressure on the tip electrode, a second circuit component and a third circuit component. A first end of the first circuit component and a first end of the second circuit component are coupled to the tip electrode. A first end of the third circuit component is coupled to the ring electrode. The touch sensitive processing apparatus comprising: an interconnection network module configured to connect to the plurality of the first electrodes, the plurality of the second electrodes, a second end of the first circuit component, a second end of the second circuit component and a second end of the third circuit component; a driving circuit module configured to provide driving signals to the second end of the first circuit component, the second end of the second circuit component and the second end of the third circuit component via the interconnection network module; a sensing circuit module configured to measure induced driving signals of the plurality of the first electrodes and the plurality of the second electrodes via the interconnection network module; and a processor module configured to execute programs stored in non-volatile memories to realize following steps: having the driving circuit module to concurrently emit the driving signals to a first circuit component combination during a first time period and having the sensing circuit module to measure the induced driving signals to retrieve first period one-dimension sensing information, wherein the first circuit component combination includes the first and the second circuit components; having the driving circuit module to concurrently emit the driving signals to a second circuit component combination during a second time period and having the sensing circuit module to measure the induced driving signals to retrieve second period one-dimension sensing information, wherein the second circuit component combination includes the first and the third circuit components; having the driving circuit module to concurrently emit the driving signals to a third circuit component combination during a third time period and having the sensing circuit module to measure the induced driving signals to retrieve third period one-dimension sensing information, wherein the third circuit component combination includes the second and the third circuit components; adding corresponding element values of the first, the second and the third period one-dimension sensing information as all period one-dimension sensing information, respectively; calculating a first circuit component one-dimension sensing information, a second circuit component one-dimension sensing information and a third circuit component one-dimension sensing information according to the all period one-dimension sensing information and the first, the second and the third period one-dimension sensing information; calculating a first coordinate, a second coordinate and a ring electrode coordinate according to the first, the second and the third circuit component one-dimension sensing information, respectively; calculating a tip electrode coordinate according to the first coordinate and the second coordinate; and calculating at least one of following according to the tip electrode coordinate and the ring electrode coordinate: a tilt angle between an axis of the stylus with regard to a plane of the touch panel; and an orientation direction on the plane of the touch panel where the axis of the stylus is projected to the touch panel.

According to an embodiment of the present application, a touch system provided comprising the aforementioned touch sensitive processing apparatus, the touch panel and the stylus.

According to an embodiment of the present application, a touch sensitive processing method provided is applicable to a touch panel and a stylus. The touch panel includes a plurality of first electrodes in parallel to a first direction and a plurality of second electrodes in parallel to a second direction. The stylus includes a tip electrode, a ring electrode surrounding the tip electrode, a first circuit component which has variable according to pressure on the tip electrode, a second circuit component and a third circuit component. A first end of the first circuit component and a first end of the second circuit component are coupled to the tip electrode. A first end of the third circuit component is coupled to the ring electrode. The touch sensitive processing method comprising: concurrently emitting driving signals to a first circuit component combination during a first time period and measuring induced driving signals of the plurality of first electrodes and the plurality of second electrodes to retrieve first period one-dimension sensing information, wherein the first circuit component combination includes the first and the second circuit components; concurrently emitting driving signals to a second circuit component combination during a second time period and measuring induced driving signals of the plurality of first electrodes and the plurality of second electrodes to retrieve second period one-dimension sensing information, wherein the second circuit component combination includes the first and the third circuit components; concurrently emitting driving signals to a third circuit component combination during a third time period and measuring induced driving signals of the plurality of first electrodes and the plurality of second electrodes to retrieve third period one-dimension sensing information, wherein the first circuit component combination includes the second and the third circuit components; adding corresponding element values of the first, the second and the third period one-dimension sensing information as all period one-dimension sensing information, respectively; calculating a first circuit component one-dimension sensing information, a second circuit component one-dimension sensing information and a third circuit component one-dimension sensing information according to the all period one-dimension sensing information and the first, the second and the third period one-dimension sensing information; calculating a first coordinate, a second coordinate and a ring electrode coordinate according to the first, the second and the third circuit component one-dimension sensing information, respectively; calculating a tip electrode coordinate according to the first coordinate and the second coordinate; and calculating at least one of following according to the tip electrode coordinate and the ring electrode coordinate: a tilt angle between an axis of the stylus with regard to a plane of the touch panel; and an orientation direction on the plane of the touch panel where the axis of the stylus is projected to the touch panel.

According to the touch sensitive processing method, apparatus and touch system of the tethered stylus provided by the present application, transmission time period of electrical signals by the stylus can be reduced, scan of the stylus by the touch screen can be accelerated, rate of reporting the scan result can be increased. Besides, information related to the stylus such as a tip electrode coordinate, a ring electrode coordinate, a tilt angle, an orientation direction, a pressure value on the tip of the stylus and a calibrated pressure value according to the tilt angle can be detected.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein:

FIG. 8 is a flow chart diagram of step 770 in accordance with one embodiment of the present application.

DETAILED DESCRIPTION OF THE PREFERRED EMBODIMENTS

Figure 1:
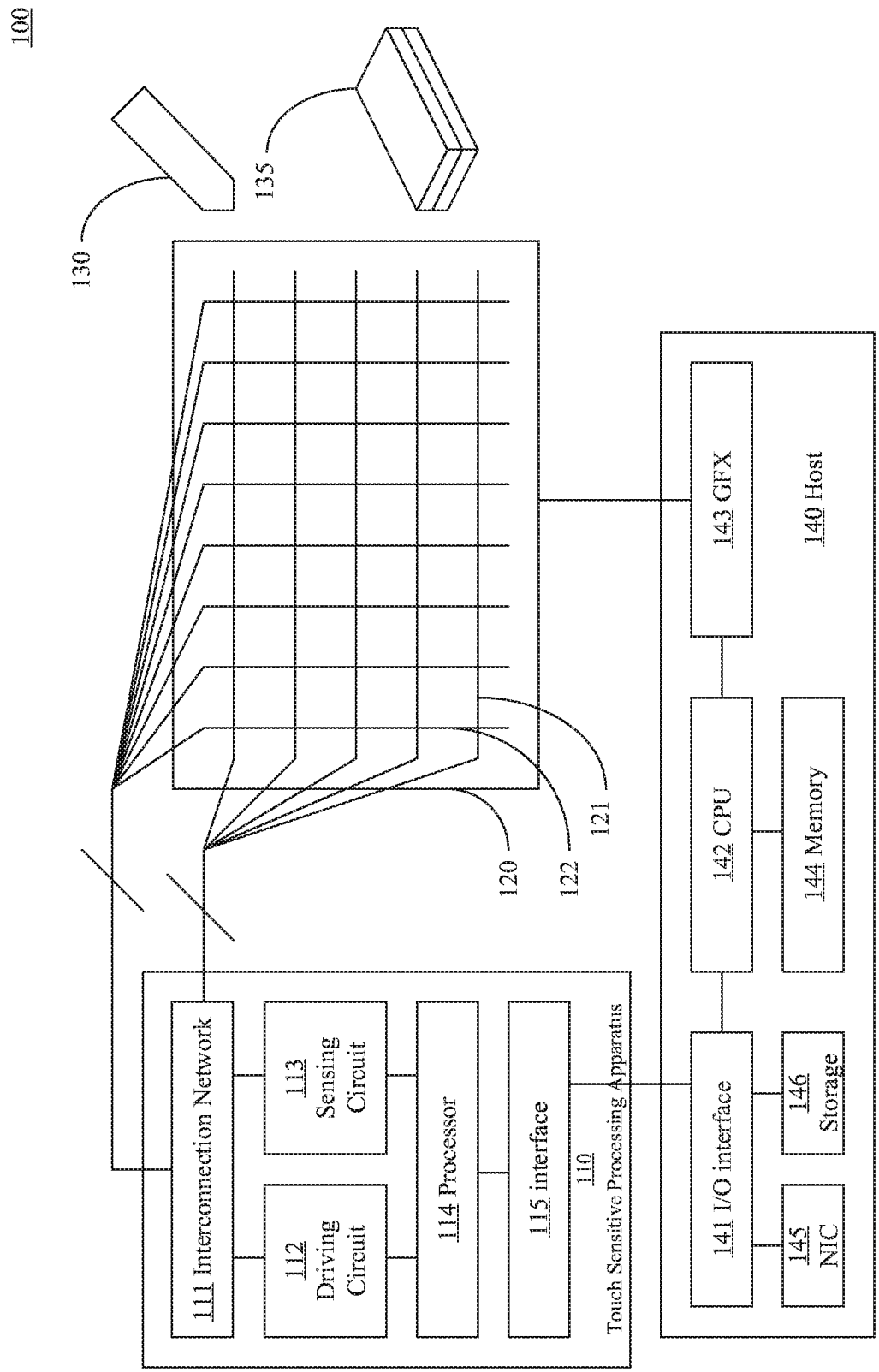
FIG. 1 is a schematic diagram shows a touch system in accordance with one embodiment of the present application.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Please refer to FIG. 1, which is a schematic diagram shows a touch system 100 in accordance with one embodiment of the present application. The touch system 100 may be normal desktop, laptop, pad-like personal computer, and industrial computer for control, smartphone or any other forms of computer systems having touch functions.

The touch system 100 may comprises a touch sensitive processing apparatus 110, a touch panel or a touch screen 120 connecting to the touch sensitive processing apparatus 110, and a host 140 connecting to the touch sensitive processing apparatus 110. Hereafter in the present application, the touch panel or the touch screen 120 is collectively called touch screen 120. However, if it is implemented in embodiments which are lack of display function, person with ordinary skill in the art can understand the touch screen referred by the present application is actually the touch panel.

The touch screen 120 comprises multiple first electrodes 121 parallel to a first axis and multiple second electrodes 122 parallel to a second axis. The first electrode 121 may be intersected with multiple second electrodes 122 in order to form multiple sensing points or sensing areas. Analogously, the second electrode 122 may be intersected with multiple first electrodes 121 in order to form multiple sensing points or sensing areas. In some embodiment, the present application may use a term "first touch sensitive electrodes" 121 instead of first electrodes 121 and may use another term "second touch sensitive electrodes" 122 instead of second electrodes. Collectively, the first electrodes 121 and the second electrodes 122 may be referred as "touch sensitive electrodes" in the present application. In some embodiments of touch screens 120, the first electrodes 121 and the second electrodes 122 are made of transparent material. The first electrodes 121 and the second electrodes 122 may be arranged in the same electrode layer, multiple conductive sheets of each of the first electrodes 121 or each of the second electrodes 122 are connected by circuit bridges. The first electrodes 121 and the second electrodes 122 may be arranged in different stacked electrode layers. Unless specially noted, the present application may be applicable to embodiments having a single electrode layer or having two electrode layers. The first axis is usually perpendicular to the second axis. However, the present application does not limit that the first axis must be perpendicular to the second axis. In one embodiment, the first axis is the horizontal axis, or pixel refreshing axis of the touch screen 120.

The touch sensitive processing apparatus 110 may comprise following hardware circuit modules: an interconnection network module 111, a driving circuit module 112, a sensing circuit module 113, a processor module 114, and an interface module 115. The touch sensitive processing apparatus 110 may be implemented inside a single integrated circuit which may include one or more chips. It may use multiple integrated circuits and an interconnected circuit board carried the multiple integrated circuits to realize the touch sensitive processing apparatus 110. The touch sensitive processing apparatus 110 and the host 140 may be implemented in the same integrated circuits, or in the same chip. In other words, the present application does not limit how to implement the touch sensitive processing apparatus 110.

The interconnection network module 111 is configured to connect each of the multiple first electrodes and/or the multiple second electrodes of the touch screen 120. The interconnection network module 111 may accept control command of the processor module 114 for connecting the driving circuit module 112 and any one or more touch electrodes and for connecting the sensing circuit 112 and any one or more touch electrodes. The interconnection network module 111 may include a combination of one or more MUX to realize the aforementioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise clock generator, frequency divider, frequency multiplier, phase lock loop, power amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. In the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 113 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor module 114 may comprises processors widely adopted in the industry such as 8051 series, Intel i960 series, ARM Cortex-M series and etc. The present application does not limit types and numbers of processors included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other modules of the touch sensitive processing apparatus 110. These instructions may include input/output interfaces of the processor module 114 to control other modules. Other modules may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the modules and the instructions.

The interface module 115 may include kinds of serial or parallel bus, such as universal serial bus (USB), $I^2C$, peripheral component interconnect (PCI), PCI-Express, IEEE 1394 and other industrial standard input/output interface. The touch sensitive processing apparatus 110 connects to the host 140 via the interface module 115.

The touch system 100 may comprise one or more styli 130 and/or touch erasers 135. The stylus 130 and touch eraser 136 may be transmitters which emit electrical signals. The transmitters may include active transmitter which actively emits electrical signals or passive transmitter which emits electrical signals in response to outside electrical signals. The stylus 130 and touch eraser 136 may comprise one or more electrodes which is configured to receive electrical signals from the touch screen synchronously or asynchronously, or to transmit electrical signals to the touch screen synchronously or asynchronously. The electrical signals may be modulated according to one or more of the aforementioned modulation methods.

The stylus 130 or touch eraser 135 may be conductor which is configured to transmit driving signals or to be grounded via user's hand or body. The stylus 130 or touch eraser 135 may be wired or wirelessly connected to an I/O interface module 141 of the host 140 or any other underlying modules of the I/O interface module 141.

The touch sensitive processing apparatus 110 may detect one or more external conductive objects such as fingers, palms or passive styli 130 or touch erasers 135 or styli 130 or touch erasers 135 emitting electrical signals via the touch screen 120. The touch sensitive processing apparatus 110 may utilize mutual-capacitance or self-capacitance principles to detect external conductive objects. The styli 130 or touch erasers 135 and touch sensitive processing apparatus 110 may use the aforementioned modulation and demodulation methods to transmit message via the electrical signals. The touch sensitive processing apparatus 110 may detect one or more positions where the stylus 130 or touch erasers 135 touches or approximates the touch screen 120, status or sensors (pressure sensor or button) onboard the stylus 130 or touch eraser 135, orientation angle or inclination angle of the stylus 130 or touch erasers 135 with respect to the touch screen 120 and etc. according to the electrical signals.

The host 140 is a main apparatus for controlling the touch system 100. It may comprises an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and one storage module 146. The CPU module 142 may comprises one or more processor or processor cores. Common processors may include Intel, AMD, VIA's x86 and x64 instruction set architecture (ISA) processors, Apple, Qualcomm, Mediatek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware modules. Persons having ordinary skill in the art should have common knowledge of computer organization and architecture. They can understand the touch system 100 disclosed by the present application is exemplary. Parts regarding to the inventive feature provided by the present application should be referred to the specification and the claim.

Figure 2:
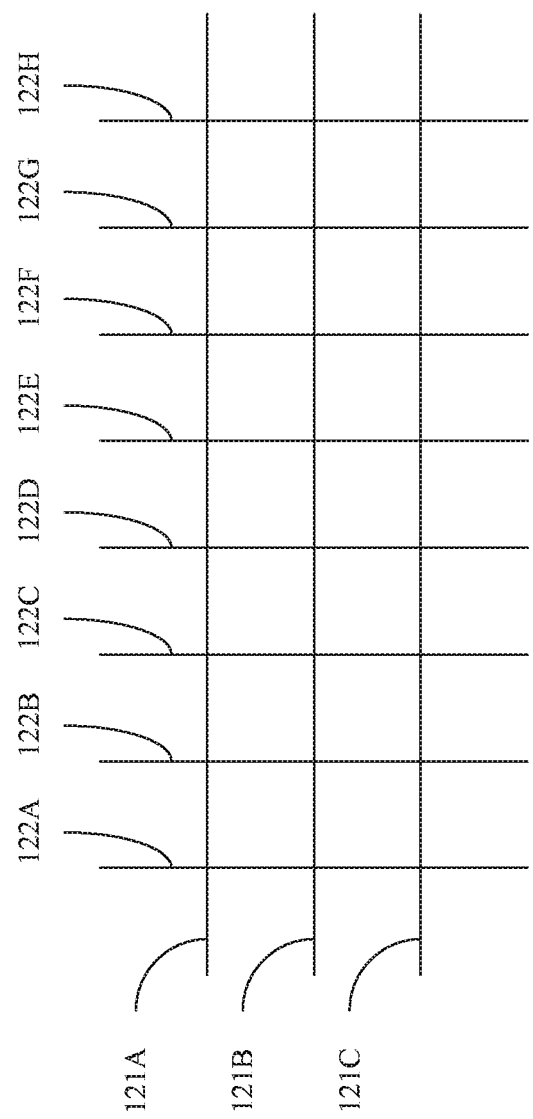
FIG. 2 is a schematic diagram depicts a touch screen according to one embodiment of the present application.

Please refer to FIG. 2, which shows a diagram of a touch screen according to an embodiment of the present application. For convenience, the touch screen 120 includes only three first electrodes 121. In a sequence, they are first electrodes 121A, 121B and 121C, respectively. The touch screen 120 comprises multiple second electrodes 122A~122H. Person having ordinary skill in the art can understand that the touch screen 120 may include N first electrodes, where N is a positive integer. In some embodiments, N is a positive integer larger than 10.

In traditional mutual-capacitance detection, the driving circuit module 112 would provide driving signals to one of the three first electrodes 121 in a time-sharing manner in order to gather three sets of one-dimension sensing information. Each set of one-dimension sensing information includes sensing results of each of the second electrodes 122. A two-dimension sensing information or a sensing image can be constructed according to the three sets of one-dimension sensing information and the driving signal transmission sequence with regard to the first electrodes 121. The processor module 114 is able to detect whether an external conductive object touches or approximates the touch screen 120 according to the two-dimension sensing information or the sensing image.

Assuming that each of the first electrodes 121 has to be driven during a length of time T, the sensing circuit module 113 can gather sufficient amount of signals. In the aforementioned traditional mutual-capacitance detection, it takes 3T length of time to scan the touch screen 120 once. To be generalized, in case there are N first electrodes 121 in the touch screen 120, it takes N×T length of time to scan the touch screen 120 once.

According to an embodiment of the present invention, a method for simultaneously scanning multiple first electrodes 121 is provided. Please refer to Table 1, which shows a timing sequence table in which the touch screen 120 as shown in FIG. 2 is scanned simultaneously.

TABLE 1

|  | First period | Second period | Third period | Total lengths of three periods |
|---|---|---|---|---|
| Length of period | T/2 | T/2 | T/2 | 1.5 T |

TABLE 1-continued

|  | First period | Second period | Third period | Total lengths of three periods |
|---|---|---|---|---|
| First electrode 121A | driven | driven |  |  |
| First electrode 121B | driven |  | driven |  |
| First electrode 121C |  | driven | driven |  |
| Induced sources of driving signals | 121A + 121B | 121A + 121C | 121B + 121C | (121A + 121B + 121C) × 2 |

In the embodiment as shown in Table 1, driving and sensing operations are performed in three periods. However, length of each of the periods is T/2. In other words, during each period, the driving signal transmitted from each of the first electrodes 121 is not sufficiently accumulated amount of signal by the sensing circuit module 113. Nevertheless, after three periods, time length of transmitting driving signal by each of the first electrodes 121 is accumulated to T; it is sufficiently long for the sensing circuit module 113 to accumulate enough amount of signal.

During each of the periods, two of the first electrodes 121 transmit driving signals simultaneously. Hence, induced signals on any one of the second electrodes 122 accumulate induced energy of driving signals transmitted from two of the first electrodes 121. As shown in the last row of Table 1, induced sources of driving signals of any one of the second electrodes 122 can be found. For example, during the first period, induced sources of any one of the second electrodes 122 are came from the first electrodes 121A and 121B. During each of the periods, sensed signals from every second electrodes 122 construct a set of one-dimension sensing information.

After finishing the driving and sensing operations in these periods, a set of first period one-dimension sensing information, a set of second period one-dimension sensing information, a set of third period one-dimension sensing information are generated, respectively. Corresponding elements in these three sets of one-dimension sensing information are added, respectively, to generate a set of accumulated one-dimension sensing information. Value of any element in the set of accumulated one-dimension sensing information represents accumulated induced signals which is also corresponding to a sum of twice of driving signals the first electrodes 121A, 121B and 121C transmit in single one of the periods. After dividing the value of any element by 2, the value represents accumulated induced signals which is corresponding to a sum of driving signals the first electrodes 121A, 121B and 121C transmit in single one of the periods. After that, a difference between the half value of any element of the set of accumulated one-dimension sensing information and value of corresponding element of the set of first period one-dimension sensing information is corresponding to driving signals the first electrodes 121C transmit in single one of the periods. At last, a double of the difference is corresponding to driving signals the first electrodes 121C transmit in two of the periods.

In the same fashion, a difference between the half value of any element of the set of accumulated one-dimension sensing information and value of corresponding element of the set of second period one-dimension sensing information is corresponding to driving signals the first electrodes 121B transmit in single one of the periods. By multiply 2 on the difference, the result is corresponding to driving signals the first electrodes 121B transmit in two of the periods.

Similarly, a difference between the half value of any element of the set of accumulated one-dimension sensing information and value of corresponding element of the set of third period one-dimension sensing information is corresponding to driving signals the first electrodes 121A transmit in single one of the periods. By multiply 2 on the difference, the result is corresponding to driving signals the first electrodes 121A transmit in two of the periods.

Element values of the first period one-dimension sensing information, the second period one-dimension sensing information, and the third period one-dimension sensing information are denoted as $M_1$, $M_2$ and $M_3$. The accumulated value of the corresponding element of the accumulated one-dimension sensing information is denoted as $M_{total}$, which is a sum of $M_1+M_2+M_3$.

$$M_{total}=M_1+M_2+M_3 \quad (1)$$

Element value $M_C$ of the one-dimension sensing information corresponding to the first electrode 121C can be calculated as:

$$M_C = 2 \times \left(\frac{M_{total}}{2} - M_1\right) = M_{total} - \frac{M_1}{2} \quad (2)$$

Element value $M_B$ of the one-dimension sensing information corresponding to the first electrode 121B can be calculated as:

$$M_B = 2 \times \left(\frac{M_{total}}{2} - M_2\right) = M_{total} - \frac{M_2}{2} \quad (3)$$

Element value $M_A$ of the one-dimension sensing information corresponding to the first electrode 121A can be calculated as:

$$M_A = 2 \times \left(\frac{M_{total}}{2} - M_3\right) = M_{total} - \frac{M_3}{2} \quad (4)$$

After the aforementioned calculations, one-dimension sensing information with regard to the first electrodes 121C, 121B and 121A can be generated according to the first period one-dimension sensing information, the second period one-dimension sensing information, and the third period one-dimension sensing information. The three element values of one-dimension sensing information with regard to the first electrodes 121A-C are corresponding to one second electrodes 122. In other words, three values corresponding to three points where the first electrodes 121A, 121B and 121C intersect with one of the second electrodes 122. The one dimension sensing information corresponding to multiple second electrodes can be used to construct a two-dimension sensing information or a sensing image. The processor module 114 is able to detect whether an external conductive object touches or approximates the touch screen 120 according to the two-dimension sensing information or the sensing image.

Comparing with traditional detection, in the equation (1), the embodiment needs to perform two extra addition operations in parallel to get the accumulated one-dimension sensing information. After that, in the equations (2), (3) and (4), three division and three subtraction operations are performed in parallel to get the sensing information with regard to three first electrodes 121. Since the denominators in the equations (2), (3) and (4) are 2, right shifting operations can be used instead of division operations. In summarized, comparing with the traditional mutual-capacitance detection method, the embodiment spends 8 additional arithmetic operations and saves sensing time 1.5 T. Because the arithmetic operations performed by the processor module 114 is far faster than the sensing time of the sensing circuit module 113, and moreover, the processor module 114 usually has scalar parallel operation unit for performing multiple operations in parallel, it saves a lot of time for scanning the touch screen 120 once. Accordingly, it increases frequency of the touch sensitive processing apparatus 110 reports external conductive objects touching or approximating the touch screen 120 to the host 140.

According to an embodiment of the present invention, a method for simultaneously scanning multiple first electrodes $121_i$ is provided, where N is a positive integer larger than 1, i is ranged from 1 to N. Please refer to Table 2, which shows a timing sequence table in which the touch screen 120 having N first electrodes 121 is scanned simultaneously.

TABLE 2

|  | First period | Second period | ... | N-th period | Total lengths of N periods |
|---|---|---|---|---|---|
| Length of period | T/(N − 1) | T/(N − 1) |  | T/(N − 1) | $\frac{N}{N-1}T$ |
| First electrode $121_1$ | driven | driven |  |  |  |
| First electrode $121_2$ | driven |  |  | driven |  |
| ... |  |  |  |  |  |
| First electrode $121_N$ |  | driven |  | driven |  |
| Induced sources of driving signals | $121_1 +$ $121_2 + \ldots +$ $121_{N-1}$ | $121_1 +$ $121_3 + \ldots +$ $121_N$ |  | $121_2 +$ $121_3 + \ldots +$ $121_N$ | $(121_1 +$ $121_2 + \ldots +$ $121_N) \times$ $(N-1)$ |

In the embodiment as shown in Table 2, the driving and sensing operations are performed in N periods. However, length of time in each period is T/(N−1). In other words, during each period, the driving signal transmitted from each of the first electrodes $121_i$ is not sufficiently accumulated amount of signal by the sensing circuit module 113. Nevertheless, after N periods, time length of transmitting driving signal by each of the first electrodes $121_i$ is accumulated to T; it is sufficiently long for the sensing circuit module 113 to accumulate enough amount of signal.

During each of the periods, (N−1) of the first electrodes 121 transmit driving signals simultaneously. Hence, induced signals on any one of the second electrodes 122 accumulate induced energy of driving signals transmitted from (N−1) of the first electrodes 121. As shown in the last row of Table 2, induced sources of driving signals of any one of the second electrodes 122 can be found. For example, during the first period, induced sources of any one of the second electrodes 122 are came from the first electrodes $121_1$ and $121_{N-1}$. During each of the periods, sensed signals from every second electrodes 122 construct a set of one-dimension sensing information.

After finishing the driving and sensing operations in these N periods, N sets of i-th period one-dimension sensing information is generated. Corresponding elements in these N sets of one-dimension sensing information are added, respectively, to generate a set of accumulated one-dimension sensing information. Value of any element in the set of accumulated one-dimension sensing information represents accumulated induced signals which is also corresponding to a sum of (N−1) multiple of driving signals the first electrodes $121_1$ through $121_N$ transmit in single one of the periods. After dividing the value of any element by (N−1), the quotient value represents accumulated induced signals which is corresponding to a sum of driving signals the first electrodes $121_1$ through $121_N$ transmit in single one of the periods. After that, a difference between the quotient value of any element of the set of accumulated one-dimension sensing information and value of corresponding element of the set of first period one-dimension sensing information is corresponding to driving signals the first electrodes $121_N$ transmit in single one of the periods. A multiple of the difference and (N−1) is corresponding to driving signals the first electrodes $121_N$ transmit in (N−1) of the periods.

Element values of the i-th period one-dimension sensing information is denoted as $M_i$, the accumulated value of the corresponding element of the accumulated one-dimension sensing information is denoted as $M_{total}$, which may be presented as:

$$M_{total} = \Sigma_1^N M_i \qquad (5)$$

Element value $X_i$ of the one-dimension sensing information corresponding to the first electrode $121_i$ can be calculated as:

$$X_i = (N-1) \times \left(\frac{M_{total}}{N-1} - M_{N-i+1}\right) = M_{total} - \frac{M_{N-i+1}}{(N-1)} \qquad (6)$$

After the aforementioned calculations, N sets of one-dimension sensing information with regard to the N first electrodes $121_i$ can be generated according to the N i-th period one-dimension sensing information. The N sets of one-dimension sensing information with regard to the N first electrodes $121_i$ can be used to construct a two-dimension sensing information or a sensing image. The processor module 114 is able to detect whether an external conductive object touches or approximates the touch screen 120 according to the two-dimension sensing information or the sensing image.

Comparing with traditional detection, in the equation (5), the embodiment needs to perform (N−1) extra addition operations in parallel to get the accumulated one-dimension sensing information. After that, in the equations (6), one division and two subtraction operations are performed in parallel to get the sensing information with regard to each of N first electrodes 121. In summarized, comparing with the traditional mutual-capacitance detection method, the embodiment spends constant time on additional arithmetic operations and saves sensing time $$\left(N - \frac{N}{N-1}\right)T.$$

For example, in case N is 10, it reduces 8.89 T sensing time. When N is bigger, more sensing time it saves.

Because the arithmetic operations performed by the processor module 114 is far faster than the sensing time of the sensing circuit module 113, and moreover, the processor module 114 usually has scalar parallel operation unit for performing multiple operations in parallel, it saves a lot of time for scanning the touch screen 120 once. Accordingly, it increases frequency of the touch sensitive processing apparatus 110 reports external conductive objects touching or approximating the touch screen 120 to the host 140.

In one embodiment, the touch screen 120 may have H×N first electrodes 121, or the number of first electrodes 121 is more than (H−1)×N and less than H×N. Hence, H operations are required, where H is a positive integer. In each of the H operation, mutual capacitance detection with regard to N first electrodes 121 in order to get one-dimension sensing information with regard to the N first electrodes 121. After the H operations are performed, multiple one-dimension sensing information with regard to H×N first electrodes 121 are generated. The processor module 114 is able to detect whether an external conductive object touches or approximates the touch screen 120 according to the two-dimension sensing information or the sensing image.

In the embodiment, the N first electrodes 121 in each one of the operations may not be adjacent to each other. In order to alleviate electromagnetic interferences caused by fixed sequence of driving signal emission, non-adjacent first electrodes 121 may be chosen in each one of the H operations. Alternatively, adjacent first electrodes 121 are chosen in each one of the H operations, but the 2N first electrodes chosen in two consecutive operations may not be adjacent. The first electrodes 121 may be selected in random to alleviate electromagnetic interferences caused by fixed frequency of driving signal emission.

According to an embodiment of the present invention, a method for simultaneously scanning multiple first electrodes 121 is provided. Please refer to Table 3, which shows a timing sequence table that multiple scanning are simultaneously performed on the touch screen 120 as shown in FIG. 2.

TABLE 3

|  | First period | Second period | Third period | Total lengths of three periods |
|---|---|---|---|---|
| Length of period | T/2 | T/2 | T/2 | 1.5 T |
| First electrode 121A | driven | driven | driven inversely in phase | |
| First electrode 121B | driven | driven inversely in phase | driven | |
| First electrode 121C | driven inversely in phase | driven | driven | |
| Induced sources of driving signals | 121A + 121B − 121C | 121A + −121B + 121C | −121A + 121B + 121C | (121A + 121B + 121C) |

In the embodiment as shown in Table 3, the driving and sensing operations are performed in 3 periods. However, length of time in each period is T/2. Comparing with the embodiment as shown in Table 1, during the first period, the driving signal emitted by the first electrode 121C is inversely in phase to the driving signal emitted by the first electrode 121A or 121B. Since the driving signal is cancelled by the inversed driving signal to the same receiving second electrode 122, during the first period, the induced driving signal of one of the second electrode 122 can be represented as 121A+121B−121C. In the same fashion, during the second period, the riving signal emitted by the first electrode 121B is inversely in phase to the driving signal emitted by the first electrode 121A or 121C. The induced driving signal of the same second electrode 122 can be represented as 121A−121B+121C. Similarly, during the third period, the riving signal emitted by the first electrode 121A is inversely in phase to the driving signal emitted by the first electrode 121B or 121C. The induced driving signal of the same second electrode 122 can be represented as −121A+121B+121C.

After finishing the driving and sensing operations in these three periods, a set of first period one-dimension sensing information, a set of second period one-dimension sensing information, a set of third period one-dimension sensing information are generated, respectively. Corresponding elements in these three sets of one-dimension sensing information are added, respectively, to generate a set of accumulated one-dimension sensing information. Value of any element in the set of accumulated one-dimension sensing information represents accumulated induced signals which is also corresponding to a sum of driving signals the first electrodes 121A, 121B and 121C transmit in single one of the periods. It can be represented as 121A+121B+121C.

A difference value between value of any element of the accumulated one-dimension sensing information and value of corresponding element of the first period one-dimension sensing information is corresponding to twice of driving signals the first electrode 121C transmits in signal one of the periods. After dividing the difference value by 2, the resulted value is corresponding to driving signals the first electrode 121C emits. In the same fashion, a difference value between value of any element of the accumulated one-dimension sensing information and value of corresponding element of the second period one-dimension sensing information is corresponding to twice of driving signals the first electrode 121B transmits in signal one of the periods. After dividing the difference value by 2, the resulted value is corresponding to driving signals the first electrode 121B emits. Similarly, a difference value between value of any element of the accumulated one-dimension sensing information and value of corresponding element of the third period one-dimension sensing information is corresponding to twice of driving signals the first electrode 121A transmits in signal one of the periods. After dividing the difference value by 2, the resulted value is corresponding to driving signals the first electrode 121A emits.

Element value $X_C$ of the one-dimension sensing information corresponding to the first electrode 121C can be calculated as:

$$X_C = (M_{total} - M_1)/2 \qquad (7)$$

Element value $X_B$ of the one-dimension sensing information corresponding to the first electrode 121B can be calculated as:

$$X_B = (M_{total} - M_2)/2 \qquad (8)$$

Element value $X_A$ of the one-dimension sensing information corresponding to the first electrode 121A can be calculated as:

$$X_A = (M_{total} - M_3)/2 \qquad (9)$$

After the aforementioned calculations, one-dimension sensing information with regard to the first electrodes 121C, 121B and 121A can be generated according to the first period one-dimension sensing information, the second period one-dimension sensing information, and the third period one-dimension sensing information. The three sets of one-dimension sensing information with regard to the first electrodes 121A-C can be used to construct a two-dimension sensing information or a sensing image.

According to an embodiment of the present invention, a method for simultaneously scanning N first electrodes $121_i$ is provided, where N is an integer larger than 1 and i is between 1 and N. Please refer to Table 4, which shows a timing sequence table that multiple scanning are simultaneously performed on the touch screen 120 having N first electrodes.

TABLE 4

|  | First period | Second period | ... | N-th period | Total lengths of N period |
|---|---|---|---|---|---|
| Length of period | T/(N − 1) | T/(N − 1) |  | T/(N − 1) | $\frac{N}{N-1}T$ |
| First electrode $121_1$ | driven | driven |  | driven inversely in phase |  |
| First electrode $121_2$ | driven | driven inversely in phase |  | driven |  |
| ... |  |  |  |  |  |
| First electrode $121_N$ | driven inversely in phase | driven |  | driven |  |
| Induced sources of driving signals | $121_1 +$ $121_2 + \ldots +$ $121_{N-1} +$ $-121_N$ | $121_1 +$ $121_3 + \ldots +$ $-121_{N-1} +$ $121_N$ |  | $-121_1 +$ $121_2 +$ $121_3 + \ldots +$ $121_N$ | $(121_1 +$ $121_2 + \ldots +$ $121_N) \times$ $(N-2)$ |

As of the embodiment shown in Table 3, in the embodiment shown in Table 4, during the i-th period, since inversed driving signal is emitted by the first electrode $121_{N-i+1}$, the element value $X_i$ of the one-dimension sensing information corresponding to the first electrode $121_i$ can be calculated as:

$$X_i = \left(\frac{N-2}{N}\right)(M_{total} - M_{N-i+1}) \quad (10)$$

After the aforementioned calculations, N sets of one-dimension sensing information with regard to the first electrode $121_i$ can be generated according to N sets of i-th period of one-dimension sensing information. Corresponding elements of the N sets of one-dimension sensing information with regard to the first electrodes $121_i$ are corresponding to one of the second electrodes 122. In other words, the N values of the corresponding elements are corresponding to N points where the first electrode $121_1$, $121_2$, ..., $121_N$ intersects with one of the second electrodes 122. Multiple sets of one-dimension sensing information with regard to the second electrodes 122 can also form two-dimension sensing information or sensing image. The processor module 114 is able to detect whether an external conductive object touches or approximates the touch screen 120 according to the two-dimension sensing information or the sensing image.

In the equation (10), two divisions and two subtractions are used to generate sensing value with regard to N first electrodes 121, respectively. In summarized, comparing with the traditional mutual-capacitance detection method, the embodiment spends additional arithmetic operation time and saves sensing time (N−NN−1T. For example, in case N is 10, it reduces 8.89 T sensing time. When N is getting bigger, more sensing time is saved.

Figure 3:
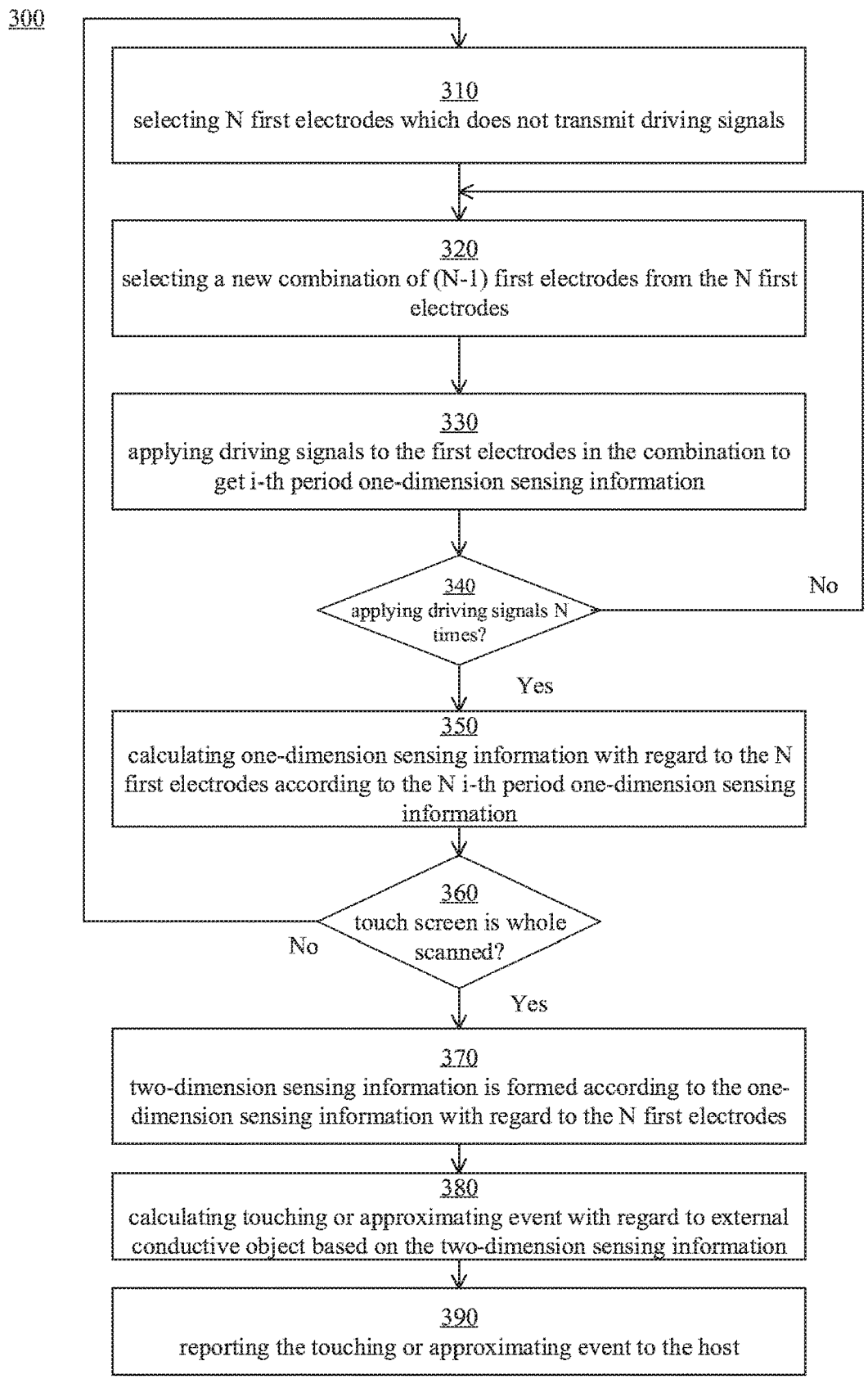
FIG. 3 is a flow chart diagram illustrates a mutual capacitance sensing method in accordance with one embodiment of the present application.

Please refer to FIG. 3, which shows a flowchart diagram of a mutual-capacitance sensing method 300 according to an embodiment of the present invention. The mutual-capacitance sensing method is applicable to the touch sensitive processing apparatus 110 as shown in FIG. 1. Especially, the processor 114 is configured to execute multiple instructions compiled according to the mutual-capacitance sensing method to realize it.

Step 310: selecting N first electrodes which does not transmit driving signals.

Step 320: designating a new combination of (N−1) first electrodes among the N first electrodes.

Step 330: applying driving signals to the first electrodes in the combination to get i-th period one-dimension sensing information, where i is an integer ranged from 1 to N. In the step 330, the time length of transmitting driving signals by the driving circuit module 112 and sensing induced driving signals on second electrodes by the sensing circuit module 112 has characteristics as shown in the Table 2 embodiment.

In one embodiment, step 330 further comprises applying inversely driving signals in phase by one of the first electrodes which does not belong to the combination. The embodiments shown in Table 3 and Table 4 are instances.

Step 340: determining whether already applying driving signals N times to the first electrodes in the combination. If the result is no, the flow goes back to step 320. If the result is yes, the flow proceeds to step 350.

Step 350: calculating one-dimension sensing information with regard to the N first electrodes according to the N i-th period one-dimension sensing information gotten in step 330 executed in N times. If no inversely driving signals in phase are transmitted by one of the first electrodes which does not belong to the combination in step 330, the calculating recited in step 350 is performed according to the embodiments as shown in Table 1 or in Table 2. More precisely, the calculating may be performed according to the Equation (6). If inversely driving signals in phase are transmitted by one of the first electrodes which does not belong to the combination in step 330, the calculating recited in step 350 is performed according to the embodiments as shown in Table 3 or in Table 4. More precisely, the calculating may be performed according to the Equation (10).

Step 360: determining whether the touch screen is whole scanned. If the result is no, the flow goes back to step 310. If the result is yes, the flow proceeds to step 370.

Step 370: two-dimension sensing information is formed according to the one-dimension sensing information with regard to the N first electrodes. The one-dimension sensing information with regard to the N first electrodes in the two-dimension sensing information is arranged based on the positions of the N first electrodes.

Step 380: calculating touching or approximating event with regard to external conductive object based on the two-dimension sensing information.

Optional step 390: reporting the touching or approximating event to the host.

Figure 4:
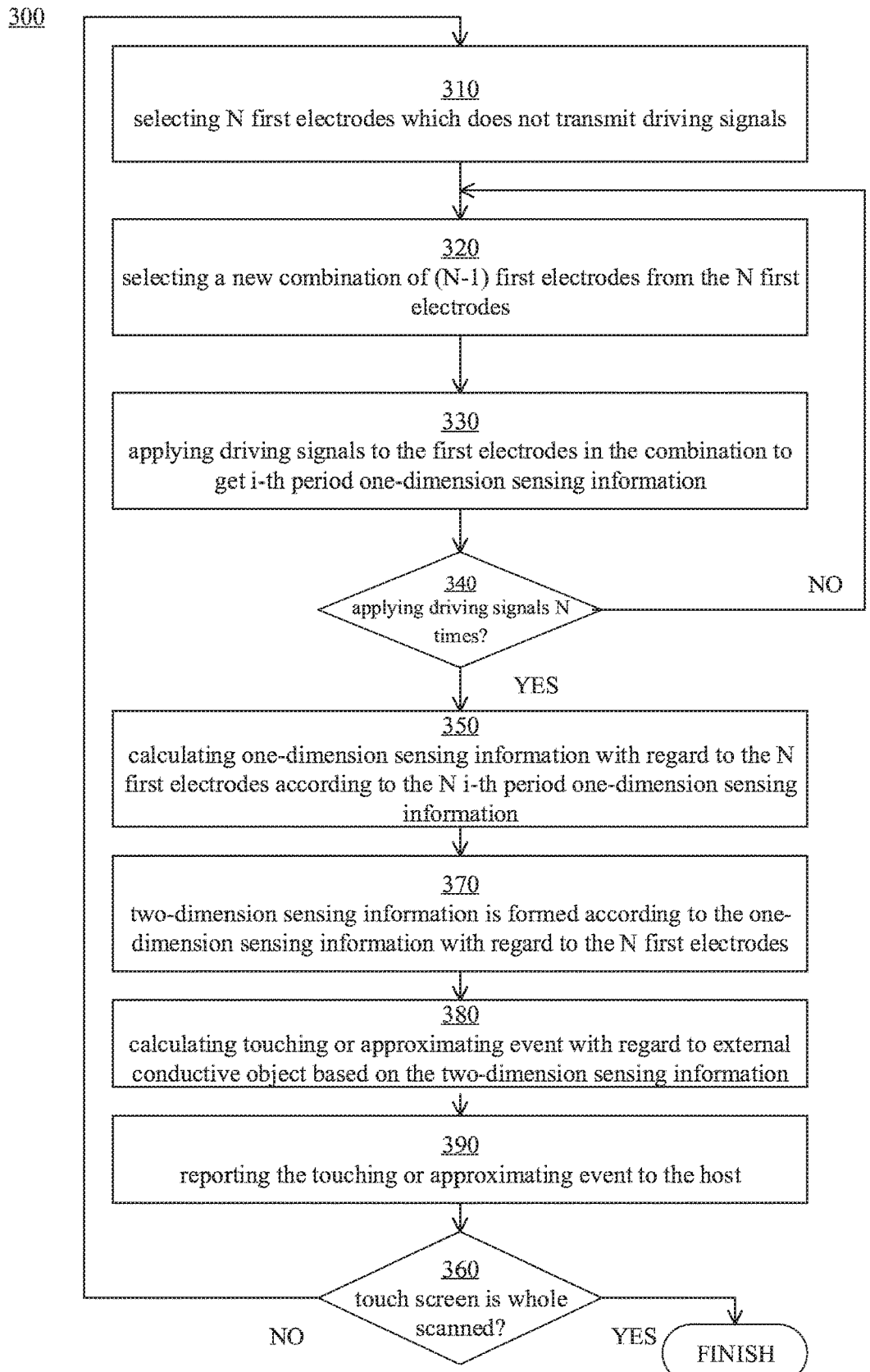
FIG. 4 is a flow chart diagram illustrates a mutual capacitance sensing method in accordance with another embodiment of the present application.

Please refer to FIG. 4, which shows a flowchart diagram of a mutual-capacitance sensing method 400 according to an embodiment of the present invention. The mutual-capacitance sensing method is applicable to the touch sensitive processing apparatus 110 as shown in FIG. 1. Especially, the processor 114 is configured to execute multiple instructions compiled according to the mutual-capacitance sensing method to realize it.

Comparing with the mutual-capacitance sensing method 300 as shown in FIG. 3, the mutual-capacitance sensing method 400 as shown in FIG. 4 is configured to retrieve two-dimension sensing information corresponding to various detection areas and to calculate and to report touching or approximating events in each detection area to the host. The e mutual-capacitance sensing method 300 as shown in FIG. 3 is configured to form one two-dimension sensing information corresponding to the whole touch screen and to calculate and to report touching or approximating events to the host. The embodiment as shown in FIG. 3 provides more accuracy of the touching and approximating events near the boundaries of two adjacent detection areas. However, it needs to preserve more one-dimension sensing information to calculate and to report in regard to the whole touch screen. The embodiment as shown in FIG. 4 provides detection to individual area. It does not need to collect information with regard to the whole touch screen before calculating and reporting.

Figure 5:
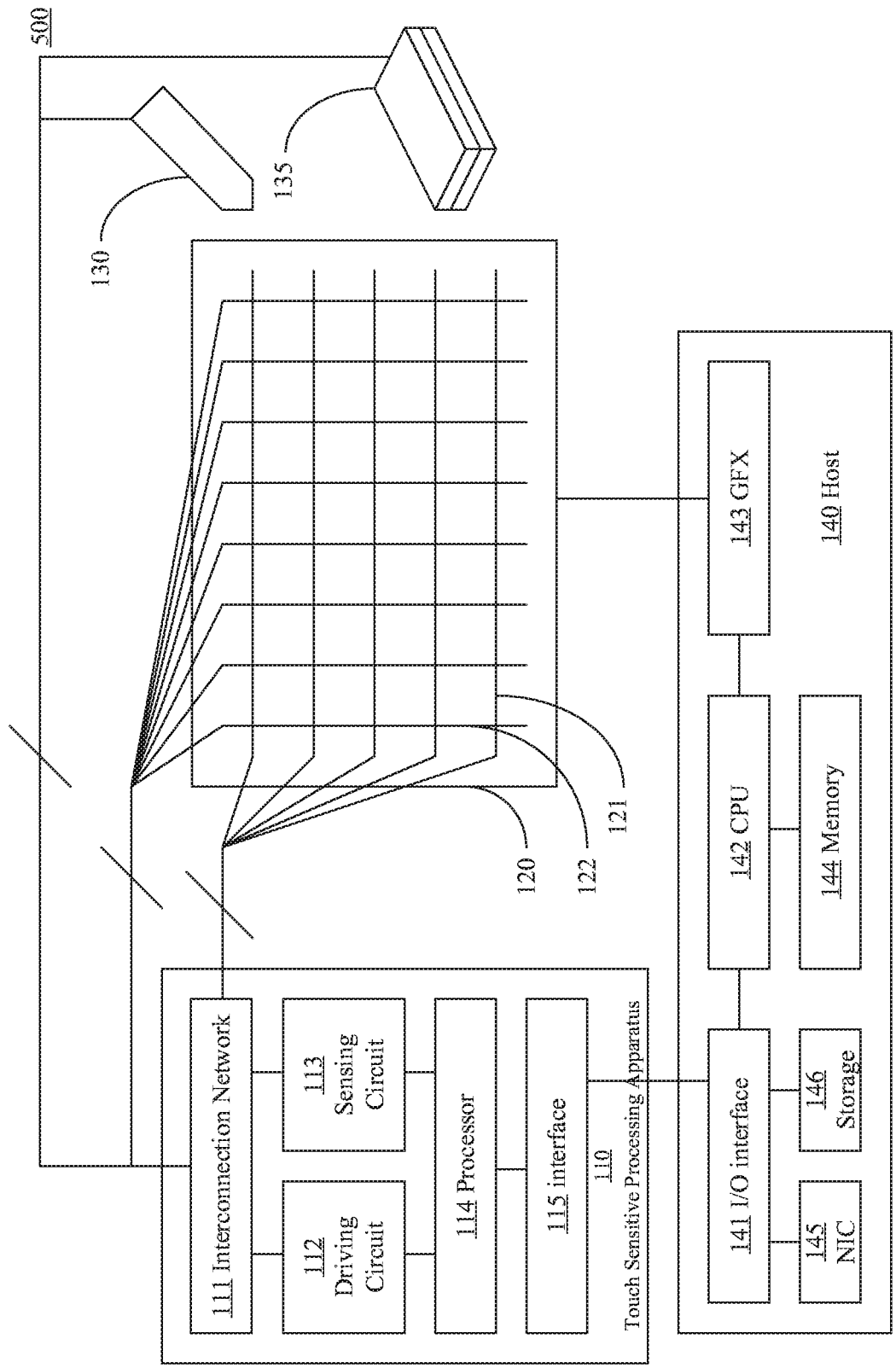
FIG. 5 is a schematic diagram shows a touch system in accordance with one embodiment of the present application.

Please refer to FIG. 5, which is a schematic diagram shows a touch system 500 in accordance with one embodiment of the present application. The touch system 500 is a variant of the touch system 100. If no further explanation, all of the description with regard to the touch system 100 may be applied to the touch system 500. The touch sensitive processing apparatus 110 of the touch system connects to the stylus 130 or the touch eraser 135 via physical wires. More specifically, the driving circuit module 112 is able to connect to the stylus 130 or the touch eraser 135 via the interconnection network module 111 and the aforementioned physical wires.

Figure 6:
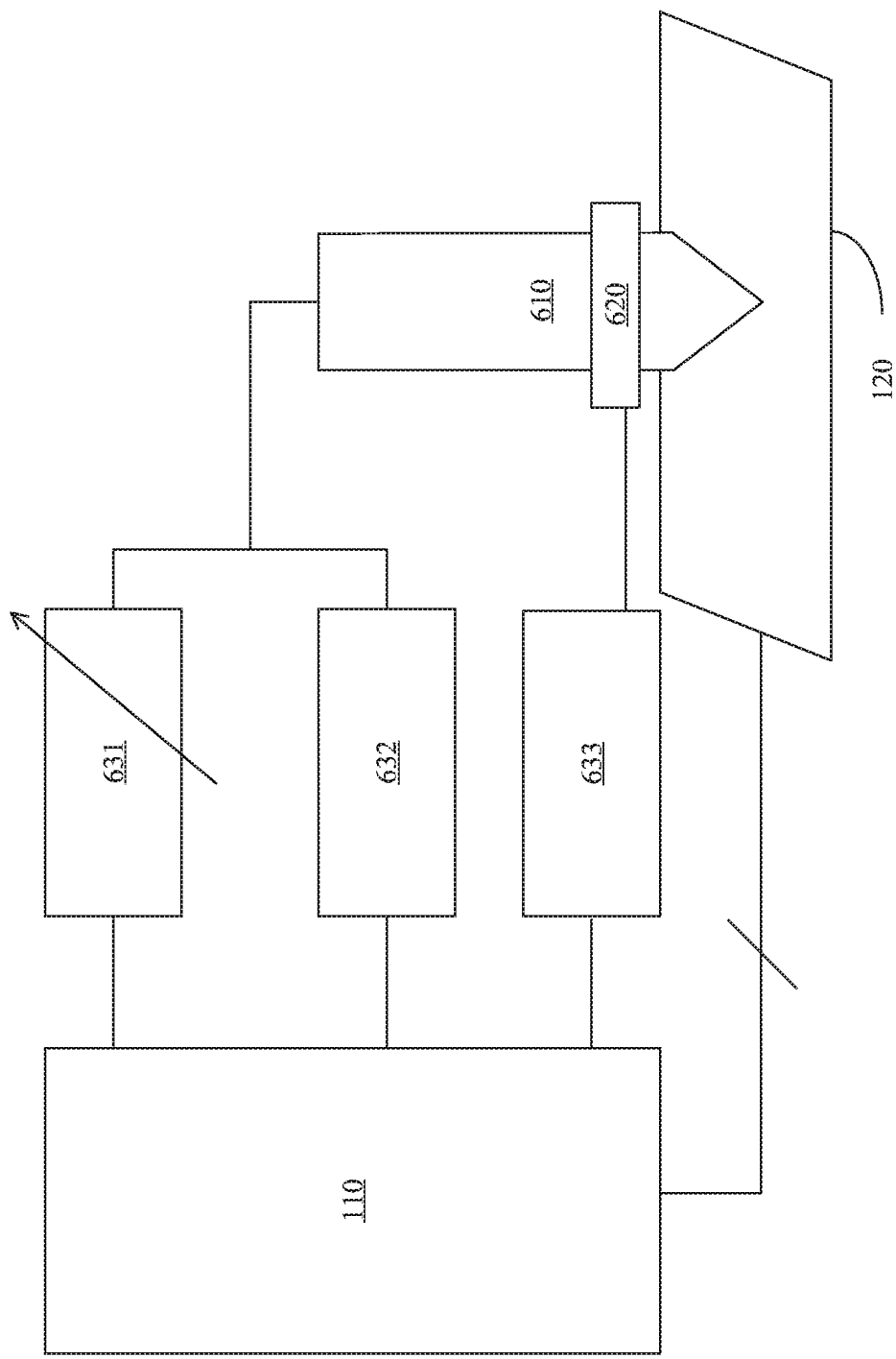
FIG. 6 is a schematic diagram depicts a stylus in accordance with an embodiment of the present invention.

Please refer to FIG. 6, which is a schematic diagram depicts a stylus 130 in accordance with an embodiment of the present invention. The stylus 130 may comprise a tip electrode 610, a ring electrode 620 and three circuit components 631, 632 and 633. The tip electrode 610 is configured to be located at one end of the stylus 130 and is used to contact the touch panel or the touch screen 120. The ring electrode 620 may be configured to be located in peripheral of the tip electrode 610. In one example, the ring electrode 620 may be surrounded of the tip electrode 610. However, these two electrodes 610 and 620 are electrically decoupled. When the tip electrode 610 touches the touch panel or touch screen 120, one part of the ring electrode 620 pretty approximates the touch panel or touch screen 120.

The circuit components 631, 632 and 633 may be capacitors, resistors or any other kinds of circuit components. A first end of the first circuit component 631 is coupled to the tip electrode 610. Resistance of the first circuit component 631 is varied according to pressure on the tip electrode 610. For example, when the pressure on the tip electrode 610 grows, changes of the resistance of the first circuit component 631 also grow. When no pressure on the tip electrode 610 of the stylus 130, the resistance of the first circuit component 631 may be identical to the resistance of the second circuit component 632. A first end of the second circuit component 632 is also coupled to the tip electrode 610. However, the resistance of the second circuit component 632 cannot be changed according to the pressure on the tip electrode 610. A first end of the third circuit component 633 is coupled to the ring electrode 620.

Seconds of the circuit components 631, 632, and 633 are coupled to the touch sensitive processing apparatus 110 via physical wires, respectively. For example, the second ends may be directly connected to the driving circuit module 112, or indirectly connected to the driving circuit module 112 via the interconnection network 111. The driving circuit module 112 may emit driving signals to the second ends of the circuit components 631, 632 and 633, respectively. The emitted driving signals may be transmitted to the touch panel or touch screen 120 via the tip electrode 610 and the ring electrode 620. Induced driving signals may be generated by the touch electrodes 121 and 122 of the touch panel or touch screen 120. The induced driving signals are transmitted to the sensing circuit module 113 via the interconnection network module 111 of the touch sensitive processing apparatus 110. The induced driving signals can be measured by the sensing circuit module 113 such that the processor module 114 is able to calculate positions of the tip electrode 610 and the ring electrode 620 corresponding to the touch panel or touch screen 120 according to the measurement results.

Since the processor module 114 is aware the timing when the driving circuit module 112 emits the driving signals, it is able to command the sensing circuit module 113 to sense the induced driving signals during a corresponding time period. Please refer to Table 5, which shows a timing sequence table in which the sensing circuit module 113 measure a particular touch electrode 121 or 122 of the touch screen 120.

TABLE 5

|  | First period | Second period | Third period | Total lengths of three periods |
|---|---|---|---|---|
| Length of period | T | T | T | 3 T |
| Circuit component 631 | driven | | | |
| Circuit component 632 | | | driven | |
| Circuit component 633 | | driven | | |
| sources of Induced driving signals | 631 | 633 | 632 | |

Supposing the sensing circuit module 113 is able to accumulate sufficient induced signals to detect the stylus 113 if the driving signals are transmitted by the driving circuit module 112 in a time period T. In the embodiment as shown in Table 5, measurements on all of the touch electrodes 121 and 122 are performed simultaneously during these three different time periods. During the first period, all sensing values corresponding to the all of the touch electrodes 121 and 122 are measured with regard to the induced signals emitted from the tip electrode 610. Accordingly, a first coordinate of the tip section 610 with respect to the touch panel or touch screen 120 is determined. In the same fashion, during the second period, all sensing values corresponding to the all of the touch electrodes 121 and 122 are measured with regard to the induced signals emitted from the ring electrode 620. Accordingly, a second coordinate of the ring section 620 with respect to the touch panel or touch screen 120 is determined. Similarly, during the third period, all sensing values corresponding to the all of the touch electrodes 121 and 122 are measured with regard to the induced signals emitted from the tip electrode 610. Accordingly, a third coordinate of the tip section 610 with respect to the touch panel or touch screen 120 is determined.

The first coordinate is supposed to be identical to the third coordinate. However, if they are different, a tip electrode coordinate corresponding to the tip electrode 610 can be calculated according to the first coordinate and the third coordinate. Besides, the second coordinate is corresponding to a ring electrode location of the ring electrode 620. Since the physical arrangement of the tip electrode 610 and the ring electrode 620 is known, the touch sensitive processing apparatus 110 is able to calculate a tilt angle and an orientation direction of the stylus 130 with regard to the touch panel or touch screen 120 according to the tip electrode coordinate and the ring electrode coordinate. The tilt angle is referred to an angle between the axis of the stylus 130 with regard to a plane of the touch panel or touch screen 120. The orientation direction is referred to a direction on the plane of the touch panel or touch screen 120 where the axis of the stylus 130 is projected to the touch panel or touch screen 120.

In addition, the pressure on the tip electrode 610 can be calculated by the touch sensitive processing apparatus 110 according to a ratio of received signal strength of at least one of the touch electrodes 121 or 122 during the first period and the third period, wherein the at least one touch electrodes 121 or 122 are corresponding to the tip electrode coordinate. In one embodiment, since there is a tilt angle between the stylus 130 and the touch panel or touch screen 120, the pressure value can be calibrated according to the tilt angle. In the embodiment as shown in Table 5, it takes three time periods to get a set of the tip electrode coordinate, the ring electrode coordinate, the tilt angle, the orientation direction and the pressure with regard to the stylus 130.

Please refer to Table 6, which shows a timing sequence table according to an embodiment of the present application in which the sensing circuit module 113 measures a particular touch electrode 121 or 122 of the touch screen 120.

TABLE 6

|  | First period | Second period | Third period | Total lengths of three periods |
|---|---|---|---|---|
| Length of period | T/2 | T/2 | T/2 | 1.5 T |
| Circuit component 631 | driven | driven | | |
| Circuit component 632 | driven | | driven | |
| Circuit component 633 | | driven | driven | |
| sources of Induced driving signals | 631 + 632 | 631 + 633 | 632 + 633 | (631 + 632 + 633) × 2 |

In the embodiment as shown in Table 6, the driving time period is reduced to a half of T. Persons having ordinary skill in the art can understand that the induced driving signals of the touch electrode get weaken because the resistance value of the circuit component 631 is changed according to the pressure. Hence, the duration of emitting driving signals may be modified as 3T/4, 3T/5 or alike. Persons having ordinary skill in the art can modify this parameter of embodiments based on the examples provided by this application.

In the embodiment as shown in Table 6, assuming that the sensing values retrieved in the first, the second and the third periods are $M_1$, $M_2$ and $M_3$, respectively. The sum of these three values denotes as $M_{total}$, which equals to $M_1+M_2+M_3$.

$$M_{total}=M_1+M_2+M_3 \quad (1)$$

Element value $X_r$ corresponding to the ring electrode 620 may be calculated as:

$$X_r = 2 \times \left(\frac{M_{total}}{2} - M_1\right) = M_{total} - \frac{M_1}{2} \quad (11)$$

Element value $X_f$ corresponding to the second circuit component 632 and the tip electrode 610 may be calculated as:

$$X_f = 2 \times \left(\frac{M_{total}}{2} - M_2\right) = M_{total} - \frac{M_2}{2} \quad (12)$$

Element value $X_v$ corresponding to the first circuit component 631 and the tip electrode 610 may be calculated as:

$$X_v = 2 \times \left(\frac{M_{total}}{2} - M_3\right) = M_{total} - \frac{M_3}{2} \quad (13)$$

After the calculations, the ring electrode coordinate or the second coordinate can be calculated according to the element values $X_r$ corresponding to multiple touch electrodes 121 and 122. The first coordinate can be calculated according to the element values $X_v$ corresponding to multiple touch electrodes 121 and 122. The third coordinate can be calculated according to the element values $X_f$ corresponding to multiple touch electrodes 121 and 122.

The first coordinate is supposed to be identical to the third coordinate. However, if they are different, the tip electrode coordinate corresponding to the tip electrode 610 can be calculated according to the first coordinate and the third coordinate. Besides, the second coordinate is corresponding to the ring electrode location of the ring electrode 620. Since the physical arrangement of the tip electrode 610 and the ring electrode 620 is known, the touch sensitive processing apparatus 110 is able to calculate a tilt angle and an orientation direction of the stylus 130 with regard to the touch panel or touch screen 120 according to the tip electrode coordinate and the ring electrode coordinate.

In addition, the pressure on the tip electrode 610 can be calculated by the touch sensitive processing apparatus 110 according to a ratio of received signal strength of at least one of the touch electrodes 121 or 122 during the first period and the third period, wherein the at least one touch electrodes 121 or 122 are corresponding to the tip electrode coordinate. In one embodiment, since there is a tilt angle between the stylus 130 and the touch panel or touch screen 120, the pressure value can be calibrated according to the tilt angle. In the embodiment as shown in Table 6, it takes one and a half time periods to get a set of the tip electrode coordinate, the ring electrode coordinate, the tilt angle, the orientation direction and the pressure with regard to the stylus 130.

Comparing with the embodiment as shown in Table 5, the reporting rate of the touch sensitive processing apparatus can be increased one fold.

Since the calculations of the coordinates only need relative values between the sensing values of multiple touch electrodes 121 and 122, the multiplication steps in the equations (11), (12) and (13) can be omitted such that the element values are only one half. The aforementioned equations (11), (12) and (13) can be modified to following equations, respectively.

$$\frac{X_r}{2} = \frac{M_{total}}{2} - M_1 \qquad (14)$$

$$\frac{X_f}{2} = \frac{M_{total}}{2} - M_2 \qquad (15)$$

$$\frac{X_v}{2} = \frac{M_{total}}{2} - M_3 \qquad (16)$$

Persons having ordinary skill in the art can understand that the embodiment as shown in Table 6 is just an example. In other embodiments, the modulations exercised in these three periods can be modified or adjusted. In one example, the driving patterns in the first and the third periods can be switched. In another instance, the driving patterns in the first and the second periods can be switched Please refer to Table 7, which shows a timing sequence table according to an embodiment of the present application in which the sensing circuit module 113 measures a particular touch electrode 121 or 122 of the touch screen 120.

TABLE 7

|  | First period | Second period | Third period | Total lengths of three periods |
|---|---|---|---|---|
| Length of period | T/2 | T/2 | T/2 | 1.5 T |
| Circuit component 631 | driven | driven | driven inversely in phase | |
| Circuit component 632 | driven | driven inversely in phase | driven | |
| Circuit component 633 | driven inversely in phase | driven | driven | |
| sources of Induced driving signals | 631 + 632 − 633 | 631 − 632 + 633 | −631 + 632 + 633 | 631 + 632 + 633 |

In the embodiment as shown in Table 7, the circuit which is not driven in Table 6 is modified to be driven inversely in phase. For example, during the first period, the driving signals passed through the circuit component 633 are inverse in phase to the signals passed through the circuit component 631 or 632.

Element value $X_r$ corresponding to the ring electrode 620 may be calculated as:

$$X_r = M_{total} - M_1 \qquad (17)$$

Element value $X_f$ corresponding to the second circuit component 632 and the tip electrode 610 may be calculated as:

$$X_f = M_{total} - M_2 \qquad (18)$$

Element value $X_v$ corresponding to the first circuit component 631 and the tip electrode 610 may be calculated as:

$$X_v = M_{total} - M_3 \qquad (19)$$

According to the equations (17), (18) and (19) or equivalent proportional element values $X_r$, $X_f$ and $X_v$, just identical to the embodiment as shown in Table 6, it takes one and a half time periods to get a set of the tip electrode coordinate, the ring electrode coordinate, the tilt angle, the orientation direction and the pressure with regard to the stylus 130. Comparing with the embodiment as shown in Table 5, the reporting rate of the touch sensitive processing apparatus can be increased one fold. Comparing with the equations (11), (12) and (13), respectively, a division operation is omitted in each of the equations (17), (18) and (19). Comparing with the equations (14), (15) and (16), respectively, a division operation is also omitted in each of the equations (17), (18) and (19). Besides, the dividends of the division operations in the equations (11) through (16) are 2. Hence, a right shift operation may be used to perform the divisions, rather than using time consuming division operations.

Figure 7:
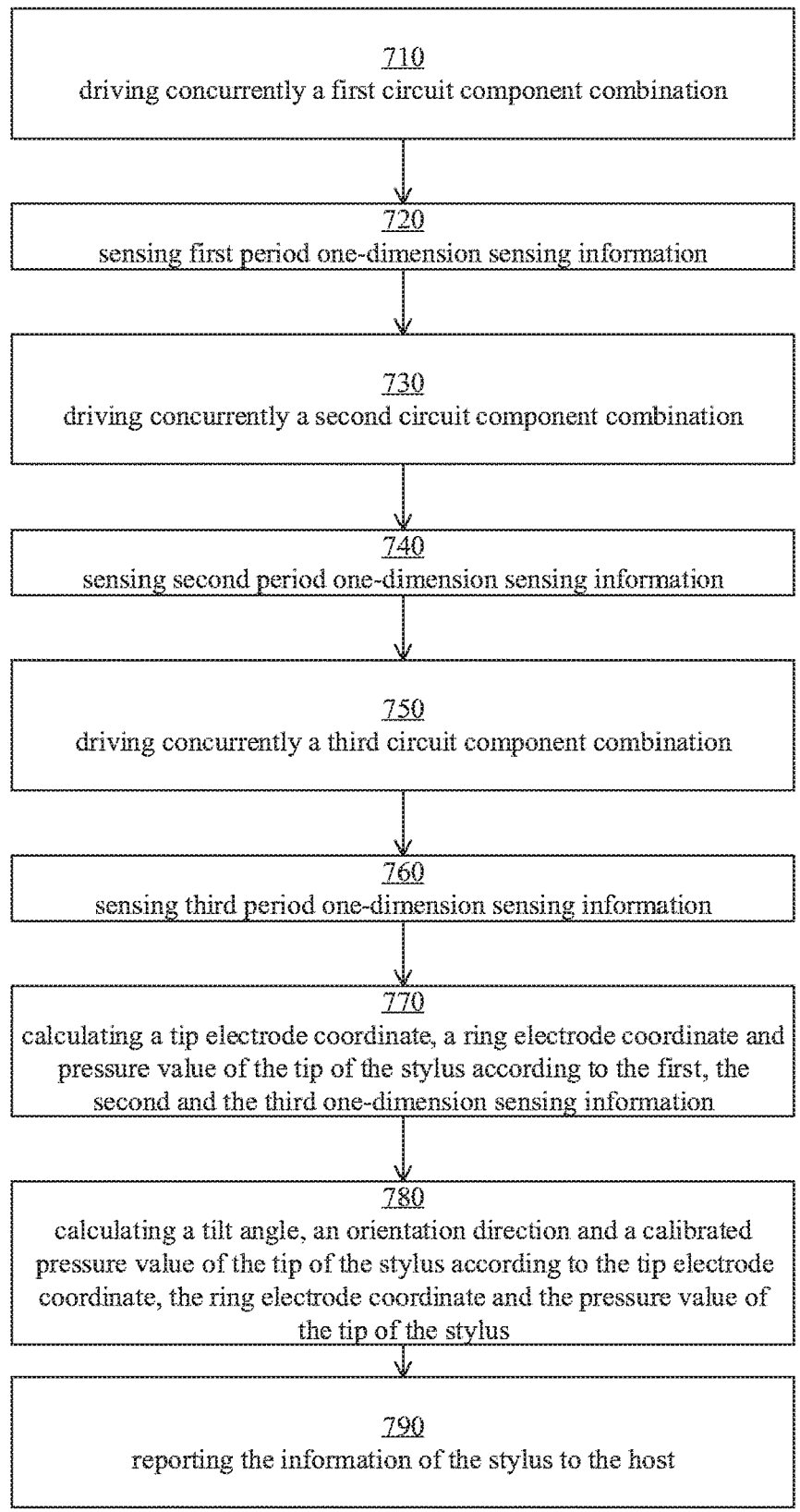
FIG. 7 is a flow chart diagram illustrates a touch sensitive processing method in accordance with one embodiment of the present application.

Please refer to FIG. 7, which is a flow chart diagram illustrates a touch sensitive processing method 700 in accordance with one embodiment of the present application. The touch sensitive processing method 700 is applicable to the touch system 500 as shown in FIG. 5, especially applicable to the touch sensitive processing apparatus 110. In one embodiment, the touch sensitive processing method 700 may be implemented as a program stored in non-volatile memory. In the touch sensitive processing method 700, steps 710 and 720 may be performed concurrently, steps 730 and 740 may be performed concurrently, and steps 750 and 760 are performed concurrently. The application does not limit the execution order of these three pairs of steps. A circuit component combination recited in the touch sensitive processing method 700 is referred to a combination of two of the three circuit components 631, 632 and 633. Since there are three circuit components, three different kinds of combinations exist.

Step 710: driving concurrently a first circuit component combination. In the embodiments as shown in Table 6 and Table 7, the first circuit component combination may include the first and the second circuit components 631 and 632 which are driven in the first period.

Step 720: sensing first period one-dimension sensing information. The touch panel or touch screen 120 as shown in FIG. 2 includes three first electrodes 121 and eight second electrodes 122. Hence, at step 720, a first period one-dimension sensing information including 11 elements is sensed. The first period one-dimension sensing information is formed by two parts. Three elements are corresponding to vertical axis. And eight elements are corresponding to horizontal axis. The present application does not limit the number of elements in the first period one-dimension sensing information. However, the first period one-dimension sensing information must include two parts corresponding to the vertical and the horizontal axes, respectively.

Step 730: driving concurrently a second circuit component combination. In the embodiments as shown in Table 6 and Table 7, the second circuit component combination may include the first and the third circuit components 631 and 633 which are driven in the second period.

Step 740: sensing second period one-dimension sensing information. This step repeats the step 720 to retrieve the second period one-dimension sensing information.

Step 750: driving concurrently a third circuit component combination. In the embodiments as shown in Table 6 and Table 7, the third circuit component combination may include the second and the third circuit components 632 and 633 which are driven in the third period.

Step 760: sensing third period one-dimension sensing information. This step repeats the step 720 to retrieve the third period one-dimension sensing information.

Step 770: calculating a tip electrode coordinate, a ring electrode coordinate and pressure value of the tip of the stylus according to the first, the second and the third one-dimension sensing information. This step is already described in the embodiments as shown in Table 6 and Table 7. Details of this step may be shown in FIG. 8.

Optional step 780: calculating a tilt angle, an orientation direction and a calibrated pressure value of the tip of the stylus according to the tip electrode coordinate, the ring electrode coordinate and the pressure value of the tip of the stylus.

Optional step 790: reporting the information of the stylus to the host. The information is referred to the multiple data calculated at steps 770 and 780. Because the host may not need all of the data, at least one of the data is reported to the host.

Please refer to FIG. 8, which is a flow chart diagram of step 770 in accordance with one embodiment of the present application.

Step 771: adding corresponding element values of the first, the second and the third as all period one-dimension sensing information, respectively.

Step 772: calculating a first circuit component one-dimension sensing information, a second circuit component one-dimension sensing information, a third circuit component one-dimension sensing information corresponding to the first, the second and the third circuit components 631, 632 and 633, respectively, according to the all period one-dimension sensing information and the first, the second and the third period one-dimension sensing information. Each of the first, the second and the third circuit component one-dimension sensing information includes a part corresponding to a vertical axis and another part corresponding to a horizontal axis. A vertical coordinate can be calculated according to the part corresponding to the vertical axis. A horizontal coordinate can be calculated according to the part corresponding to the horizontal axis.

Step 773, calculating a first coordinate, a second coordinate, and a ring electrode coordinates, respectively, according to the first, the second and the third circuit component one-dimension sensing information. The first coordinate is calculated according to the first circuit component one-dimension sensing information. The second coordinate is calculated according to the second circuit component one-dimension sensing information. The ring electrode coordinate is calculated according to the third circuit component one-dimension sensing information.

Step 774: calculating a tip electrode coordinate according to the first and the second coordinates.

Step 775: calculating a tilt angle and an orientation direction according to the tip electrode coordinate and the ring electrode coordinate.

Step 776: calculating a pressure on the tip of the stylus according to a ratio of two elements of the first and the second circuit component one-dimension sensing information corresponding to at least one touch electrode 121 or 122 which is further corresponding to the tip electrode coordinate. At this step, if two or more touch electrodes 121 or 122 are concerned, a first average of corresponding elements of the first circuit component one-dimension sensing information is calculated and a second average of corresponding elements of the second circuit component one-dimension sensing information is also calculated. At last, based on a ratio between the first and the second averages, the pressure on the tip of the stylus is calculated consequently.

Figure 9:
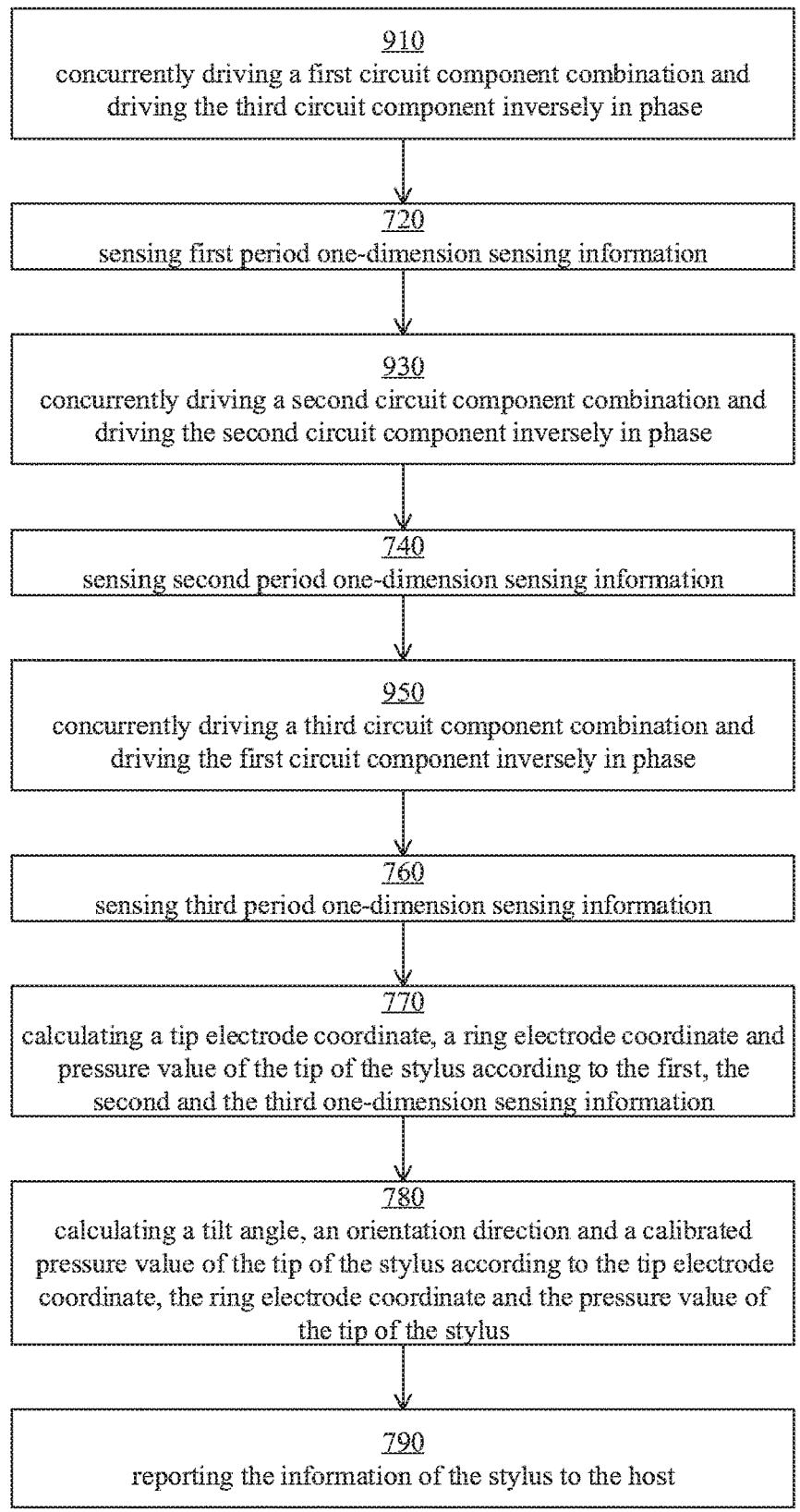
FIG. 9 is a flow chart diagram illustrates a touch sensitive processing method in accordance with one embodiment of the present application.

Please refer to FIG. 9, which is a flow chart diagram illustrates a touch sensitive processing method 900 in accordance with one embodiment of the present application. The touch sensitive processing method 900 is a variant of the touch sensitive processing method 700. Unless explanation, all descriptions with regard to the touch sensitive processing method 700 can be applicable to the touch sensitive processing method 900. In the touch sensitive processing method 900, the steps 910 and 720 are performed concurrently, the steps 920 and 740 are performed concurrently, and the steps 950 and 760 are performed concurrently. The present application does not limit the execution orders of these three pairs of steps. The steps 910, 930 and 950 are mentioned in the embodiment as shown in Table 7.

Step 910: concurrently driving a first circuit component combination and driving the third circuit component inversely in phase. Like the embodiment as shown in Table 7, the first circuit component combination may include the first and the second circuit components 631 and 632 which are driven in the first period. The third circuit component 633 is driven inversely in phase.

Step 930: concurrently driving a second circuit component combination and driving the second circuit component inversely in phase. Like the embodiment as shown in Table 7, the second circuit component combination may include the first and the third circuit components 631 and 633 which are driven in the second period. The second circuit component 632 is driven inversely in phase.

Step 950: concurrently driving a third circuit component combination and driving the first circuit component inversely in phase. Like the embodiment as shown in Table 7, the third circuit component combination may include the second and the third circuit components 632 and 633 which are driven in the third period. The first circuit component 631 is driven inversely in phase.

According to one embodiment, a touch sensitive processing apparatus provided is applicable to a touch panel and a stylus. The touch panel includes a plurality of first electrodes in parallel to a first direction and a plurality of second electrodes in parallel to a second direction. The stylus includes a tip electrode, a ring electrode surrounding the tip electrode, a first circuit component which has variable according to pressure on the tip electrode, a second circuit component and a third circuit component. A first end of the first circuit component and a first end of the second circuit component are coupled to the tip electrode. A first end of the third circuit component is coupled to the ring electrode. The touch sensitive processing apparatus comprising: an interconnection network module configured to connect to the plurality of the first electrodes, the plurality of the second electrodes, a second end of the first circuit component, a second end of the second circuit component and a second end of the third circuit component; a driving circuit module configured to provide driving signals to the second end of the first circuit component, the second end of the second circuit component and the second end of the third circuit component via the interconnection network module; a sensing circuit module configured to measure induced driving signals of the plurality of the first electrodes and the plurality of the second electrodes via the interconnection network module; and a processor module configured to execute programs stored in non-volatile memories to realize following steps: having the driving circuit module to concurrently emit the driving signals to a first circuit component combination during a first time period and having the sensing circuit module to measure the induced driving signals to retrieve first period one-dimension sensing information, wherein the first circuit component combination includes the first and the second circuit components; having the driving circuit module to concurrently emit the driving signals to a second circuit component combination during a second time period and having the sensing circuit module to measure the induced driving signals to retrieve second period one-dimension sensing information, wherein the second circuit component combination includes the first and the third circuit components; having the driving circuit module to concurrently emit the driving signals to a third circuit component combination during a third time period and having the sensing circuit module to measure the induced driving signals to retrieve third period one-dimension sensing information, wherein the third circuit component combination includes the second and the third circuit components; adding corresponding element values of the first, the second and the third period one-dimension sensing information as all period one-dimension sensing information, respectively; calculating a first circuit component one-dimension sensing information, a second circuit component one-dimension sensing information and a third circuit component one-dimension sensing information according to the all period one-dimension sensing information and the first, the second and the third period one-dimension sensing information; calculating a first coordinate, a second coordinate and a ring electrode coordinate according to the first, the second and the third circuit component one-dimension sensing information, respectively; calculating a tip electrode coordinate according to the first coordinate and the second coordinate; and calculating at least one of following according to the tip electrode coordinate and the ring electrode coordinate: a tilt angle between an axis of the stylus with regard to a plane of the touch panel; and an orientation direction on the plane of the touch panel where the axis of the stylus is projected to the touch panel.

In one embodiment, in order to calculate pressure on the tip of the stylus, the processor module is further configured to calculate a pressure value of the tip electrode of the stylus according to a ratio of two elements of the first and the second circuit component one-dimension sensing information corresponding to at least one of the first electrodes or the second electrodes which is further corresponding to the tip electrode coordinate.

In one embodiment, in order to get downward pressure against to the touch panel when the stylus is not pointing vertically to the touch panel, the processor module is further configured to calculate a calibrated pressure value according to the tilt angle and the pressure value.

In one embodiment, similar to the embodiment as shown in Table 7, in order to reduce calculations, the processor module is further configured to have the driving circuit module to emit driving signals inversely in phase to the third circuit component during the first time period; have the driving circuit module to emit driving signals inversely in phase to the second circuit component during the second time period; and have the driving circuit module to emit driving signals inversely in phase to the first circuit component during the third time period.

In one embodiment, similar to the embodiments as shown in Table 6 and Table 7, in order to reduce time to detect stylus and to increase rate of reporting stylus related information, the sensing circuit module measures sufficient the induced driving signals of one of the first electrodes or the second electrodes corresponding to the ring electrode coordinate if the driving signal emitted by the driving circuit module via the third circuit component and the ring electrode lasting for two of the third periods.

In one embodiment, in order to streamline calculations of pressure on the tip of the stylus, the lengths of the first, the second and the third time periods are identical, the first circuit component comprises a force sensing capacitor or a force sensing resistor which has varied resistance according to the pressure on the tip electrode.

In one embodiment, in order to conveniently calculating pressure on the tip of the stylus or to determine whether the tip electrode is being pressed or not, the first circuit component and the second circuit component have identical resistances if the first circuit component is not being pressed.

In one embodiment, in order to setup the lengths of the three time periods, the second circuit component and the third circuit component have identical resistances.

According to an embodiment of the present application, a touch system provided comprising the aforementioned touch sensitive processing apparatus, the touch panel and the stylus.

According to an embodiment of the present application, a touch sensitive processing method provided is applicable to a touch panel and a stylus. The touch panel includes a plurality of first electrodes in parallel to a first direction and a plurality of second electrodes in parallel to a second direction. The stylus includes a tip electrode, a ring electrode surrounding the tip electrode, a first circuit component which has variable according to pressure on the tip electrode, a second circuit component and a third circuit component. A first end of the first circuit component and a first end of the second circuit component are coupled to the tip electrode. A first end of the third circuit component is coupled to the ring electrode. The touch sensitive processing method comprising: concurrently emitting driving signals to a first circuit component combination during a first time period and measuring induced driving signals of the plurality of first electrodes and the plurality of second electrodes to retrieve first period one-dimension sensing information, wherein the first circuit component combination includes the first and the second circuit components; concurrently emitting driving signals to a second circuit component combination during a second time period and measuring induced driving signals of the plurality of first electrodes and the plurality of second electrodes to retrieve second period one-dimension sensing information, wherein the second circuit component combination includes the first and the third circuit components; concurrently emitting driving signals to a third circuit component combination during a third time period and measuring induced driving signals of the plurality of first electrodes and the plurality of second electrodes to retrieve third period one-dimension sensing information, wherein the first circuit component combination includes the second and the third circuit components; adding corresponding element values of the first, the second and the third period one-dimension sensing information as all period one-dimension sensing information, respectively; calculating a first circuit component one-dimension sensing information, a second circuit component one-dimension sensing information and a third circuit component one-dimension sensing information according to the all period one-dimension sensing information and the first, the second and the third period one-dimension sensing information; calculating a first coordinate, a second coordinate and a ring electrode coordinate according to the first, the second and the third circuit component one-dimension sensing information, respectively; calculating a tip electrode coordinate according to the first coordinate and the second coordinate; and calculating at least one of following according to the tip electrode coordinate and the ring electrode coordinate: a tilt angle between an axis of the stylus with regard to a plane of the touch panel; and an orientation direction on the plane of the touch panel where the axis of the stylus is projected to the touch panel.

In one embodiment, in order to calculate pressure on the tip of the stylus, the touch sensitive processing method further comprises: calculating a pressure value of the tip electrode of the stylus according to a ratio of two elements of the first and the second circuit component one-dimension sensing information corresponding to at least one of the first electrodes or the second electrodes which is further corresponding to the tip electrode coordinate.

In one embodiment, in order to get downward pressure against to the touch panel when the stylus is not pointing vertically to the touch panel, the touch sensitive processing method further comprises: calculating a calibrated pressure value according to the tilt angle and the pressure value.

In one embodiment, similar to the embodiment as shown in Table 7, in order to reduce calculations, the touch sensitive processing method further comprises: emitting driving signals inversely in phase to the third circuit component during the first time period; emitting driving signals inversely in phase to the second circuit component during the second time period; and emitting driving signals inversely in phase to the first circuit component during the third time period.

In one embodiment, similar to the embodiments as shown in Table 6 and Table 7, in order to reduce time to detect stylus and to increase rate of reporting stylus related information, the induced driving signals of one of the first electrodes or the second electrodes corresponding to the ring electrode coordinate are sufficiently measured if the driving signal emitted via the third circuit component and the ring electrode lasting for two of the third periods.

In one embodiment, in order to streamline calculations of pressure on the tip of the stylus, the lengths of the first, the second and the third time periods are identical, the first circuit component comprises a force sensing capacitor or a force sensing resistor which has varied resistance according to the pressure on the tip electrode.

In one embodiment, in order to conveniently calculating pressure on the tip of the stylus or to determine whether the tip electrode is being pressed or not, the first circuit component and the second circuit component have identical resistances if the first circuit component is not being pressed.

In one embodiment, in order to setup the lengths of the three time periods, the second circuit component and the third circuit component have identical resistances.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive processing apparatus, applicable to a touch panel and a stylus, wherein the touch panel includes a plurality of first electrodes in parallel to a first direction and a plurality of second electrodes in parallel to a second direction, wherein the stylus includes a tip electrode, a ring electrode surrounding the tip electrode, a first circuit component which has variable according to pressure on the tip electrode, a second circuit component and a third circuit component, a first end of the first circuit component and a first end of the second circuit component are coupled to the tip electrode, a first end of the third circuit component is coupled to the ring electrode, the touch sensitive processing apparatus comprising:

an interconnection network module configured to connect to the plurality of the first electrodes, the plurality of the second electrodes, a second end of the first circuit component, a second end of the second circuit component and a second end of the third circuit component;

a driving circuit module configured to provide driving signals to the second end of the first circuit component, the second end of the second circuit component and the second end of the third circuit component via the interconnection network module;

a sensing circuit module configured to measure induced driving signals of the plurality of the first electrodes and the plurality of the second electrodes via the interconnection network module; and a processor module configured to execute programs stored in non-volatile memories to realize following steps:

having the driving circuit module to concurrently emit the driving signals to a first circuit component combination during a first time period and having the sensing circuit module to measure the induced driving signals to retrieve first period one-dimension sensing information, wherein the first circuit component combination includes the first and the second circuit components;

having the driving circuit module to concurrently emit the driving signals to a second circuit component combination during a second time period and having the sensing circuit module to measure the induced driving signals to retrieve second period one-dimension sensing information, wherein the second circuit component combination includes the first and the third circuit components;

having the driving circuit module to concurrently emit the driving signals to a third circuit component combination during a third time period and having the sensing circuit module to measure the induced driving signals to retrieve third period one-dimension sensing information, wherein the third circuit component combination includes the second and the third circuit components;

adding corresponding element values of the first, the second and the third period one-dimension sensing information as all period one-dimension sensing information, respectively;

calculating a first circuit component one-dimension sensing information, a second circuit component one-dimension sensing information and a third circuit component one-dimension sensing information according to the all period one-dimension sensing information and the first, the second and the third period one-dimension sensing information;

calculating a first coordinate, a second coordinate and a ring electrode coordinate according to the first, the second and the third circuit component one-dimension sensing information, respectively;

calculating a tip electrode coordinate according to the first coordinate and the second coordinate; and calculating at least one of following according to the tip electrode coordinate and the ring electrode coordinate:

a tilt angle between an axis of the stylus with regard to a plane of the touch panel; and
an orientation direction on the plane of the touch panel where the axis of the stylus is projected to the touch panel.

2. The touch sensitive apparatus of claim 1, wherein the processor module is further configured to calculate a pressure value of the tip electrode of the stylus according to a ratio of two elements of the first and the second circuit component one-dimension sensing information corresponding to at least one of the first electrodes or the second electrodes which is further corresponding to the tip electrode coordinate.

3. The touch sensitive apparatus of claim 2, wherein the processor module is further configured to calculate a calibrated pressure value according to the tilt angle and the pressure value.

4. The touch sensitive apparatus of claim 1, wherein the processor module is further configured to
have the driving circuit module to emit driving signals inversely in phase to the third circuit component during the first time period;
have the driving circuit module to emit driving signals inversely in phase to the second circuit component during the second time period; and
have the driving circuit module to emit driving signals inversely in phase to the first circuit component during the third time period.

5. The touch sensitive apparatus of claim 1, wherein the sensing circuit module measures sufficient the induced driving signals of one of the first electrodes or the second electrodes corresponding to the ring electrode coordinate if the driving signal emitted by the driving circuit module via the third circuit component and the ring electrode lasting for two of the third periods.

6. The touch sensitive apparatus of claim 1, wherein the lengths of the first, the second and the third time periods are identical, the first circuit component comprises a force sensing capacitor or a force sensing resistor which has varied resistance according to the pressure on the tip electrode.

7. The touch sensitive apparatus of claim 1, wherein the first circuit component and the second circuit component have identical resistances if the first circuit component is not being pressed.

8. The touch sensitive apparatus of claim 1, wherein the second circuit component and the third circuit component have identical resistances.

9. A touch system, comprising the touch sensitive apparatus, the touch panel and the stylus of claim 1.

10. A touch sensitive processing method, applicable to a touch panel and a stylus, wherein the touch panel includes a plurality of first electrodes in parallel to a first direction and a plurality of second electrodes in parallel to a second direction, wherein the stylus includes a tip electrode, a ring electrode surrounding the tip electrode, a first circuit component which has variable according to pressure on the tip electrode, a second circuit component and a third circuit component, a first end of the first circuit component and a first end of the second circuit component are coupled to the tip electrode, a first end of the third circuit component is coupled to the ring electrode, the touch sensitive processing method comprising:
concurrently emitting driving signals to a first circuit component combination during a first time period and measuring induced driving signals of the plurality of first electrodes and the plurality of second electrodes to retrieve first period one-dimension sensing information, wherein the first circuit component combination includes the first and the second circuit components;
concurrently emitting driving signals to a second circuit component combination during a second time period and measuring induced driving signals of the plurality of first electrodes and the plurality of second electrodes to retrieve second period one-dimension sensing information, wherein the second circuit component combination includes the first and the third circuit components;
concurrently emitting driving signals to a third circuit component combination during a third time period and measuring induced driving signals of the plurality of first electrodes and the plurality of second electrodes to retrieve third period one-dimension sensing information, wherein the first circuit component combination includes the second and the third circuit components;
adding corresponding element values of the first, the second and the third period one-dimension sensing information as all period one-dimension sensing information, respectively;
calculating a first circuit component one-dimension sensing information, a second circuit component one-dimension sensing information and a third circuit component one-dimension sensing information according to the all period one-dimension sensing information and the first, the second and the third period one-dimension sensing information;
calculating a first coordinate, a second coordinate and a ring electrode coordinate according to the first, the second and the third circuit component one-dimension sensing information, respectively;
calculating a tip electrode coordinate according to the first coordinate and the second coordinate; and
calculating at least one of following according to the tip electrode coordinate and the ring electrode coordinate:
a tilt angle between an axis of the stylus with regard to a plane of the touch panel; and
an orientation direction on the plane of the touch panel where the axis of the stylus is projected to the touch panel.

11. The touch sensitive processing method of claim 10, further comprises:
calculating a pressure value of the tip electrode of the stylus according to a ratio of two elements of the first and the second circuit component one-dimension sensing information corresponding to at least one of the first electrodes or the second electrodes which is further corresponding to the tip electrode coordinate.

12. The touch sensitive processing method of claim 11, further comprises:
calculating a calibrated pressure value according to the tilt angle and the pressure value.

13. The touch sensitive processing method of claim 10, further comprises:
emitting driving signals inversely in phase to the third circuit component during the first time period;
emitting driving signals inversely in phase to the second circuit component during the second time period; and
emitting driving signals inversely in phase to the first circuit component during the third time period.

14. The touch sensitive processing method of claim 10, wherein the induced driving signals of one of the first electrodes or the second electrodes corresponding to the ring electrode coordinate are sufficiently measured if the driving signal emitted via the third circuit component and the ring electrode lasting for two of the third periods.

15. The touch sensitive processing method of claim 10, wherein the lengths of the first, the second and the third time periods are identical, the first circuit component comprises a force sensing capacitor or a force sensing resistor which has varied resistance according to the pressure on the tip electrode.

16. The touch sensitive processing method of claim 10, wherein the first circuit component and the second circuit component have identical resistances if the first circuit component is not being pressed.

17. The touch sensitive processing method of claim 10, wherein the second circuit component and the third circuit component have identical resistances.

* * * * *